(12) United States Patent
Washington et al.

(10) Patent No.: US 10,165,149 B2
(45) Date of Patent: Dec. 25, 2018

(54) METHODS AND SYSTEMS FOR AUTOMATICALLY GENERATING A NAME FOR AN ELECTRONIC DOCUMENT

(71) Applicant: Xerox Corporation, Norwalk, CT (US)

(72) Inventors: John Washington, Knebworth (GB); John Barry Poxon, Stevenage (GB)

(73) Assignee: Xerox Corporation, Norwalk, CT (US)

( * ) Notice: Subject to any disclaimer, the term of this patent is extended or adjusted under 35 U.S.C. 154(b) by 182 days.

(21) Appl. No.: 15/267,744

(22) Filed: Sep. 16, 2016

(65) Prior Publication Data

US 2018/0084138 A1   Mar. 22, 2018

(51) Int. Cl.
| | |
|---|---|
| *H04N 1/04* | (2006.01) |
| *H04N 1/21* | (2006.01) |
| *G06F 17/24* | (2006.01) |
| *G06F 17/27* | (2006.01) |
| *G06F 3/0482* | (2013.01) |
| *H04N 1/00* | (2006.01) |
| *G06K 9/00* | (2006.01) |

(52) U.S. Cl.
CPC ......... *H04N 1/2166* (2013.01); *G06F 3/0482* (2013.01); *G06F 17/24* (2013.01); *G06F 17/276* (2013.01); *G06K 9/00469* (2013.01); *H04N 1/00811* (2013.01); *H04N 1/04* (2013.01); *G06K 2209/01* (2013.01); *H04N 2201/0081* (2013.01); *H04N 2201/3229* (2013.01)

(58) Field of Classification Search
CPC .... H04N 1/2166; H04N 1/04; H04N 1/00811; H04N 2201/3229; H04N 2201/0081
USPC ....................... 358/403, 474, 1.15
See application file for complete search history.

(56) References Cited

U.S. PATENT DOCUMENTS

2014/0093170 A1* 4/2014 Ohguro .............. G06K 9/00469
                                                              382/176
2015/0205777 A1   7/2015 Campanelli et al.

* cited by examiner

*Primary Examiner* — Houshang Safaipour
(74) *Attorney, Agent, or Firm* — Fox Rothschild LLP

(57) ABSTRACT

A system of automatically naming an electronic document may include a scanning device. The system may receive a physical document that is to be converted into an electronic document, perform optical character recognition on at least a portion of the physical document to identify one or more terms that are present in the physical document, and store the identified terms in the data store associated with the scanning device. The system may receive input from a user that includes one or more first characters and corresponds to a title of the electronic document. The system may identify one or more terms from the data store that correspond to the one or more first characters by querying the data store using the received input, and cause the identified terms to be displayed to the user via a display device of the scanning device as suggested document names for the electronic document.

18 Claims, 4 Drawing Sheets

MANOR APARTMENTS AND CONDOS
MAIN STREET, USA
APPLICATION TO RENT

Applicant's Name: Jessica Smith

Date of Birth: April 5, 1974

Social Security #: xxx-xx-xxxx

Phone #: 888-111-1234

Current Address: 123 Main Street, City, State, Zip

Email address: jessicasmith@email.com

Current Employer: self-employed

Applicant's Monthly Income: $3,000
Name of Bank: Hometown Bank
Account #: xxxxxxxxxx How many adults will be living in the apartment? 1
How many children will be living in the apartment? 0

Credit Reference: Mike Jones    Phone #: 888-213-1221
Credit Reference: Sarah Peters    Phone #: 902-123-0990

Pets: No

Signature: _____

FIG. 3

METHODS AND SYSTEMS FOR AUTOMATICALLY GENERATING A NAME FOR AN ELECTRONIC DOCUMENT

BACKGROUND

When images are scanned by a scanning device, a user usually must manually input a name for the images at the scanning device to avoid producing a generic name, such as "DOC01.PDF." However, using a virtual keyboard of a graphical user interface of the scanning device can be cumbersome and time consuming.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a system of automatically naming an electronic document may include a scanning device. A scanning device may include an input device, a display device, a data store in communication with the electronic device, and a computer-readable storage medium. The computer-readable storage medium may include one or more programming instructions that, when executed, cause the scanning device to receive a physical document that is to be converted into an electronic document, perform optical character recognition on at least a portion of the physical document to identify one or more terms that are present in the physical document, and store the identified terms in the data store associated with the scanning device. The system may receive, from the input device, input from a user that includes one or more first characters and corresponds to a title of the electronic document. The system may identify one or more terms from the data store that correspond to the one or more first characters by querying the data store using the received input, and cause the identified terms to be displayed to the user via a display device of the scanning device as suggested document names for the electronic document.

In an embodiment, the system may, in response to receiving a selection of one of the identified terms, identify the selected identified term as the title of the electronic document, and store the selected identified term in a metadata file associated with the electronic document. In response to not receiving a selection of one of the identified terms, the system may identify the input as the title of the electronic document, and store the input in a metadata file associated with the electronic document.

In various embodiments, the system may determine that the input being provided by a user is being provided in a field associated with a name of the scanning document.

Optionally, the data store may be configured to store one or more rules, and the system may perform optical character recognition on at least a portion of the physical document to identify one or more terms that are present in the physical document and satisfy the one or more rules.

In an embodiment, identifying one or more terms that correspond to one or more first characters may involve the system identifying one or more terms that begin with the one or more first characters. Alternatively, the system may identify one or more terms that comprise the one or more first characters.

In various embodiments, the system may receive one or more second characters, and identify one or more updated terms by querying the data store. The updated term may begin with the one or more first characters followed by the one or more second characters. The system may cause the updated terms to be displayed to the user via the display device as updated suggested document names for the electronic document, and the updated suggested document names may replace the suggested document names.

In an embodiment, the system may receive one or more second characters, and identify one or more updated terms by querying the data store. The updated term may include the one or more first characters and the one or more second characters. The system may cause the updated terms to be displayed to the user via the display device as updated suggested document names for the electronic document, and the updated suggested document names may replace the suggested document names.

BRIEF DESCRIPTION OF THE DRAWINGS

FIG. 3 illustrates an example physical document according to an embodiment.

DETAILED DESCRIPTION

The following terms shall have, for purposes of this application, the respective meanings set forth below:

A "computing device" or "electronic device" refers to a device that includes a processor and tangible, computer-readable memory. The memory may contain programming instructions that, when executed by the processor, cause the electronic device to perform one or more operations according to the programming instructions. Examples of electronic devices include personal computers, servers, mainframes, gaming systems, televisions, and portable electronic devices such as smartphones, personal digital assistants, cameras, tablet computers, laptop computers, media players and the like.

A "mobile electronic device" refers to a portable electronic device that includes an image capturing device, a processor and tangible, computer-readable memory. The memory may contain programming instructions in the form of a software application that, when executed by the processor, causes the device to perform one or image acquisition and processing operations according to the programming instructions. Examples of mobile electronic devices include portable electronic devices such as smartphones, personal digital assistants, cameras, tablet devices, personal computers and the like.

The term "physical document" refers to a hard-copy document on a substrate that is printed off of a printer or that can be scanned into a digital form. It may consist of a single sheet or a set of sheets, and may include text, pictures, images, graphics and/or the like.

The term "digital document file," "document file," "electronic document" or "electronic document file" refers to a digital representation of a document such as a word processor file, a PDF file, or a bitmap file (e.g. TIFF, JPG, PNG files etc.) that is stored in a computer readable memory or a storage medium. A document file may be an electronic representation of a physical document that contains one or multiple pages.

A "scanning device" refers to an electronic device that is capable of performing the mechanical or electronic conversion of scanned or otherwise captured images of typewritten or printed text into machine-encoded/computer-readable text, such as, for example, an electronic document. Example scanning devices include, without limitation, scanners, multifunction devices, mobile electronic devices and/or the like.

Figure 1:
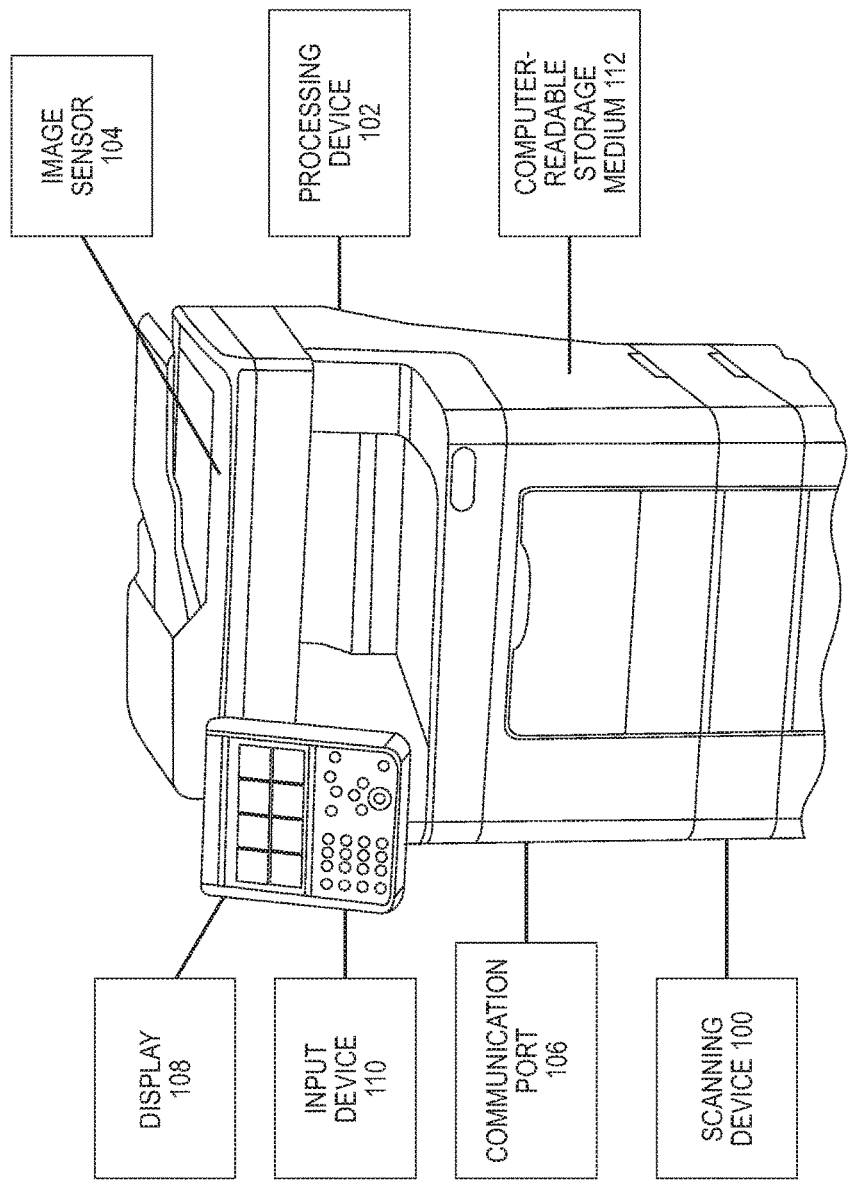
FIG. 1 illustrates an example system of automatically assigning a name to an electronic document according to an embodiment.

FIG. 1 illustrates an example system of automatically assigning a name to an electronic document. As illustrated by FIG. 1, the system may include a scanning device 100, such as, for example, a multifunction device as shown in FIG. 1. Although FIG. 1 illustrates a multifunction device, it is understood that other scanning devices, such as for example, mobile electronic devices, may be used within the scope of this disclosure.

The scanning device may include a processing device 102 that is communicatively coupled to an image sensor 104 and a communication port 106. A scanning device 100 may include a computer-readable storage medium 112. The computer-readable storage medium 112 may store one or more electronic documents.

In an embodiment, a scanning device may have a display 108 and an input device 110. An input device 110 may be a keyboard, a touch screen and/or the like. For instance, in an embodiment, a display 108 may include a touch-screen keyboard. In various embodiments, a scanning device 100 may include a platen on which documents may be placed for scanning. In certain embodiments, a scanning device 100 may include an image capturing device such as, for example, a camera.

Figure 2:
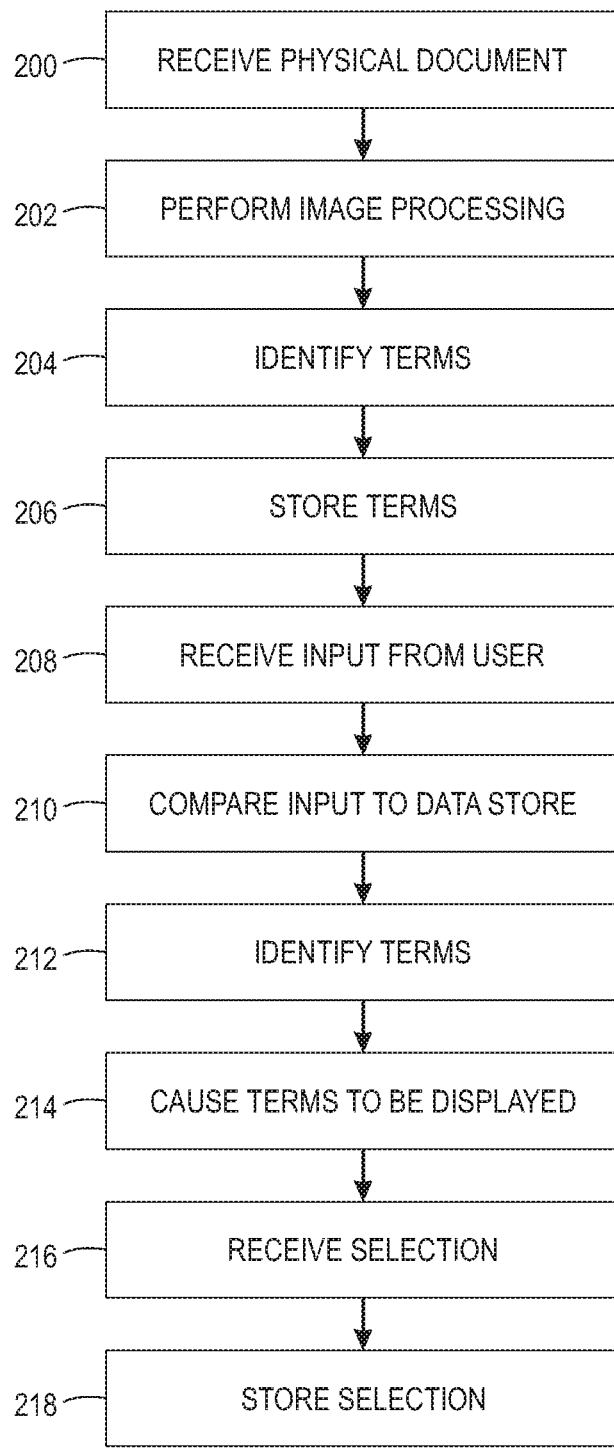
FIG. 2 illustrates an example method of assigning a name to an electronic document according to an embodiment.

FIG. 2 illustrates an example method of assigning a name to an electronic document according to an embodiment. As illustrated by FIG. 2, a scanning device may receive 200 a physical document that is to be converted to an electronic device. For instance, a scanning device may receive 200 a physical document from a user via an input tray or a sheet feeder. In another example, a scanning device may receive 200 a physical document that is placed on its platen. In another embodiment, in the case of a scanning device that is a mobile electronic device, the scanning device may receive 200 a physical document by capturing an image of the document using an image capturing device such as, for example, a camera. FIG. 3 illustrates an example physical document that may be received by a scanning device according to an embodiment.

In an embodiment, a scanning device may perform 202 image processing on the received document to generate a corresponding electronic document. A scanning device may use one or more image sensors to generate an electronic document. For instance, a scanning device may analyze a physical document to generate a two-dimensional representation. A scanning device may perform optical character recognition (OCR) on a physical document to generate an electronic document representation.

In various embodiments, performing 202 image processing may involve identifying 204 one or more terms that are included in the physical document. A term may refer to a word, a phrase, a label, and/or the like. For instance, a scanning device may perform OCR or other image processing techniques to identify one or more words from the physical document.

A scanning device may store 206 the identified terms in a data store, such as a database, a table and/or the like. The data store may be a local data store resident on the scanning device. Alternatively, the data store may be located remotely from the scanning device and may be communicatively coupled to the scanning device.

In various embodiments, a scanning device may only identify 204 one or more terms from the physical document that satisfy one or more rules. For instance, an identified term may be required to contain a minimum number of characters. Or articles, like "a", "and" and "the" may not identified. As another example, only terms that are positioned near a top portion of the physical document may be identified, as an appropriate name or title for the document may be more likely to be located at the beginning of the document rather than the end. In various embodiments, numbers such as dates, times, amounts, identifiers, and/or the like may not be identified as terms. In alternate embodiments, numbers or certain numbers may be identified as terms.

In various embodiments, a data store of a scanning device may store one or more rules. In performing image processing of a physical document, a scanning device may compare one or more terms from the physical document to one or more of the stored rules. In an embodiment, if a scanning device determines that a term satisfies all of the rules, the scanning device may store the term in a data store. Alternatively, if a scanning device determines that a term satisfies one or more rules, the scanning device may store the term in a data store.

FIG. 3 illustrates an example physical document according to an embodiment. As an example, Table 1 illustrates an example data store corresponding to the physical document of FIG. 3 that has been scanned and parsed. Table 1 shows example terms extracted from the physical document. It is understood that these are example terms and additional and/or alternate terms may be used within the scope of this disclosure. As illustrated by Table 1, the terms may include both words and phrases:

TABLE 1

Manor
Apartments
Condos
Manor Apartments
Manor Apartments and Condos
Jessica
Smith
Jessica Smith
Main
Street
Main Street
Application
Rent
Application to Rent In an embodiment, a scanning device may receive 208 input from a user pertaining to a name of the electronic document. For instance, once a physical document has been scanned, a scanning document may prompt a user to input a name or title for the electronic document. In some instances, a scanning device may automatically determine a generic name for an electronic document, such as, for example, DOC01.PDF, and a user may override the generic name with a more specific name. Alternatively, a scanning device may not automatically name an electronic document, but rather may name the electronic device based on user input.

In an embodiment, a scanning device may determine that a user wants to provide a name for the electronic document. For instance, a scanning device may recognize when a user touches a touch screen at or near a field associated with a name input. As another example, a scanning device may recognize when a user types, places the location of a mouse on a display device or otherwise provides input pertaining to a name field or label.

The scanning device may receive 208 one or more characters as part of the user's input. The scanning device may dynamically analyze the received input to determine what character or characters were entered by a user. For instance, a user may use a keyboard displayed on a touch screen to enter a name of a document. Alternatively, a user may type the name using a keyboard, or use an input device, such as a mouse, to select one or more characters. The scanning device may receive the characters from the input device. For instance, referring to the above example, a scanning device may receive the character 'a'.

In an embodiment, the scanning device may compare 210 the received character(s) to one or more of the terms stored in the data store. For example, the scanning device may search the data store for one or more terms that match or otherwise correspond to the received characters. In certain embodiments, the terms may be stored alphabetically in the data store to minimize search time. Table 2 illustrates an alphabetically indexed data store corresponding to Table 1 according to an embodiment.

TABLE 2

Apartments
Application
Application to Rent
Condos
Jessica
Jessica Smith
Main
Main Street
Manor
Manor Apartments
Manor Apartments and Condos
Rent
Smith
Street A scanning device may identify 212 one or more terms from the data store that correspond to the received characters. Referring back to the example, a scanning device may compare the received character 'a' to the terms in the data store illustrated in Table 1 or Table 2, and may identify the terms 'Apartments', 'Application', and 'Application to Rent.' Received characters may correspond to a term in a data store if the term begins with the characters, if the term includes the characters and/or the like.

In an embodiment, a scanning device may cause 214 one or more of the identified terms to be displayed to a user on a display device as suggested names for a title of the electronic document. For instance, a user who enters an 'a' may be provided with the options of "Apartments", "Application" and "Application to Rent" as titles. These options may be displayed on a display device to a user, and if the user would like to use one of the options, the user may select it via an input device.

In an embodiment, the scanning device may dynamically compare received input to terms in a data store to update its suggestions. For instance, a user may enter an "a" followed by a "p" and an "r." In the above example, the scanning device may update its comparison to only suggest "Apartments" as a title.

A scanning device may receive 216 a selection of a suggestion from a user. For instance, a user may touch or otherwise use an input device to select a displayed suggested name. In this situation, the scanning device may store 218 the received selection as the name or title of the electronic document. For example, the scanning device may store 218 the selection in a metadata file associated with the electronic document.

Alternatively, a user may not choose to select one of the scanning device's suggestions as the name of the electronic document. In this situation, the scanning device may instead store the received input from the user as the name or title of the electronic document.

In various embodiments, a scanning device may store either a selection or received input as the name of the corresponding electronic document. The name may be displayed to users via a display device of the scanning device. In addition, if a user chooses to perform an action on the electronic document, the scanning device may utilize the name in such action. For instance, a user may instruct a scanning device to email an electronic document to the user's email account via a communication port of the scanning device. The user may instruct the scanning device to include the electronic document by selecting a graphical representation of the electronic document or requesting the electronic document by name. The scanning device may send the electronic document to the user's email account such that the name of the electronic document is reflected in the email message. For instance, the electronic document may be attached to an email message, and the attachment may bear the name of the electronic document. Alternatively, an email message may include a link, such as a hyperlink or other cross-reference to the electronic document, and the link may include the name of the electronic document. In an embodiment, the scanning device may generate an email message to a user whose subject line includes the name of the electronic document.

Figure 4:
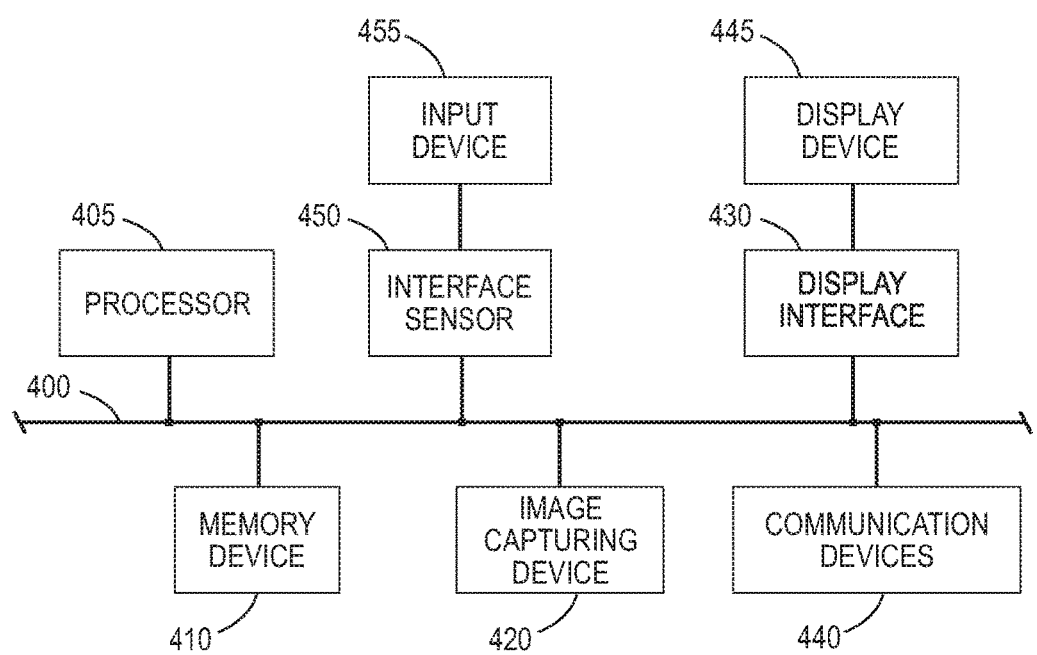
FIG. 4 illustrates a block diagram of example hardware that may be used to contain or implement program instructions according to an embodiment.

FIG. 4 depicts an example of internal hardware that may be included in any of the electronic components of the system, such as the user electronic device, or the remote server. An electrical bus 400 serves as an information highway interconnecting the other illustrated components of the hardware. Processor 405 is a central processing device of the system, configured to perform calculations and logic operations required to execute programming instructions. As used in this document and in the claims, the terms "processor" and "processing device" may refer to a single processor or any number of processors in a set of processors. Read only memory (ROM), random access memory (RAM), flash memory, hard drives and other devices capable of storing electronic data constitute examples of memory devices 410. A memory device may include a single device or a collection of devices across which data and/or instructions are stored.

An optional display interface 430 may permit information from the bus 400 to be displayed on a display device 445 in visual, graphic or alphanumeric format. An audio interface and audio output (such as a speaker) also may be provided. Communication with external devices may occur using various communication devices 440 such as a transmitter and/or receiver, antenna, an RFID tag and/or short-range or near-field communication circuitry. A communication device 440 may be attached to a communications network, such as the Internet, a local area network or a cellular telephone data network.

The hardware may also include a user interface sensor 445 that allows for receipt of data from input devices 450 such as a keyboard, a mouse, a joystick, a touchscreen (which may be part of the display), a remote control, a pointing device, a video input device and/or an audio input device. Data also may be received from an imaging capturing device 420 such as a scanner or camera.

In some embodiments, the system may use additional hardware components, such as a biometric device, a clock circuit and or a positioning system (such as a Global Positioning System sensor).

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A system comprising a scanning device, wherein the scanning device comprises:
   an input device;
   a display device;
   a data store in communication with the electronic device; and
   a computer-readable storage medium comprising one or more programming instructions that, when executed, cause the scanning device to:
      receive a physical document that is to be converted into an electronic document,
      perform optical character recognition on at least a portion of the physical document to identify one or more terms that are present in the physical document,
      store the identified terms in the data store associated with the scanning device,
      receive, from the input device, input from a user, wherein the input comprises one or more first characters and corresponds to a title of the electronic document,
      identify one or more terms from the data store that correspond to the one or more first characters by querying the data store using the received input, and
      cause the identified terms to be displayed to the user via a display device of the scanning device as suggested document names for the electronic document.

2. The system of claim 1, wherein the computer-readable storage medium further comprises one or more programming instructions that, when executed, cause the scanning device to:
   in response to receiving a selection of one of the identified terms, identify the selected identified term as the title of the electronic document, and store the selected identified term in a metadata file associated with the electronic document.

3. The system of claim 1, wherein the computer-readable storage medium further comprises one or more programming instructions that, when executed, cause the scanning device to:
   in response to not receiving a selection of one of the identified terms, identify the input as the title of the electronic document, and store the input in a metadata file associated with the electronic document.

4. The system of claim 1, wherein the one or more programming instructions that, when executed, cause the electronic device to receive, from the input device, input from a user, comprise one or more programming instructions that, when executed, cause the scanning device to determine that the input is being provided in a field associated with a name of the scanning document.

5. The system of claim of claim 1, wherein:
   the data store is configured to store one or more rules; and
   the one or more programming instructions that, when executed, cause the scanning device to perform optical character recognition on at least a portion of the physical document to identify one or more terms that are present in the physical document comprise one or more programming instructions that, when executed, cause the scanning device to perform optical character recognition on at least a portion of the physical document to identify one or more terms that are present in the physical document and satisfy the one or more rules.

6. The system of claim 1, wherein the one or more programming instructions that, when executed, cause the scanning device to identify one or more terms that correspond to the one or more first characters comprise one or more programming instructions that, when executed, cause the scanning device to identify one or more terms that begin with the one or more first characters.

7. The system of claim 1, wherein the one or more programming instructions that, when executed, cause the scanning device to identify one or more terms that correspond to the one or more first characters comprise one or more programming instructions that, when executed, cause the scanning device to identify one or more terms that comprise the one or more first characters.

8. The system of claim 1, wherein the computer-readable storage medium further comprises one or more programming instructions that, when executed, cause the scanning device to:
   receive one or more second characters;
   identify one or more updated terms by querying the data store, wherein the updated term begins with the one or more first characters followed by the one or more second characters; and
   cause the updated terms to be displayed to the user via the display device as updated suggested document names for the electronic document, wherein the updated suggested document names replace the suggested document names.

9. The system of claim 1, wherein the computer-readable storage medium further comprises one or more programming instructions that, when executed, cause the scanning device to:
   receive one or more second characters;
   identify one or more updated terms by querying the data store, wherein the updated term comprises the one or more first characters and the one or more second characters; and
   cause the updated terms to be displayed to the user via the display device as updated suggested document names for the electronic document, wherein the updated suggested document names replace the suggested document names.

10. A method comprising, by a scanning device:
    receiving a physical document that is to be converted into an electronic document;

performing optical character recognition on at least a portion of the physical document to identify one or more terms that are present in the physical document;

storing the identified terms in the data store associated with the scanning device;

receiving input from a user, wherein the input comprises one or more first characters and corresponds to a title of the electronic document;

identifying one or more terms from the data store that correspond to the one or more first characters by querying the data store using the received input; and causing the identified terms to be displayed to the user via a display device of the scanning device as suggested document names for the electronic document.

11. The method of claim 10, further comprising:
in response to receiving a selection of one of the identified terms, identifying the selected identified term as the title of the electronic document, and storing the selected identified term in a metadata file associated with the electronic document.

12. The method of claim 10, further comprising:
in response to not receiving a selection of one of the identified terms, identifying the input as the title of the electronic document, and storing the input in a metadata file associated with the electronic document.

13. The method of claim 10, wherein receiving input from a user comprises determining that the input is being provided in a field associated with a name of the electronic document.

14. The method of claim of claim 10, wherein:
the data store is configured to store one or more rules; and
performing optical character recognition on at least a portion of the physical document to identify one or more terms that are present in the physical document comprises performing optical character recognition on at least a portion of the physical document to identify one or more terms that are present in the physical document and satisfy the one or more rules.

15. The method of claim 10, wherein identifying one or more terms that correspond to the one or more first characters comprises identifying one or more terms that begin with the one or more first characters.

16. The method of claim 10, wherein identifying one or more terms that correspond to the one or more first characters comprises identifying one or more terms that comprise the one or more first characters.

17. The method of claim 10, further comprising:
receiving one or more second characters;
identifying one or more updated terms by querying the data store, wherein the updated term begins with the one or more first characters followed by the one or more second characters; and
causing the updated terms to be displayed to the user via the display device as updated suggested document names for the electronic document, wherein the updated suggested document names replace the suggested document names.

18. The method of claim 10, further comprising:
receiving one or more second characters;
identifying one or more updated terms by querying the data store, wherein the updated term comprises the one or more first characters and the one or more second characters; and
causing the updated terms to be displayed to the user via the display device as updated suggested document names for the electronic document, wherein the updated suggested document names replace the suggested document names.

\* \* \* \* \*